United States Patent Office 3,782,977
Patented Jan. 1, 1974

---

3,782,977
METHOD FOR PREPARING COLLAGEN COMPOSITIONS
William E. Henderson and Camilla B. Ross, Hinsdale, Ill., assignors to Union Carbide Corporation, New York, N.Y.
Filed Sept. 1, 1971, Ser. No. 176,863
Int. Cl. A22c *13/00*
U.S. Cl. 426—140                               15 Claims

ABSTRACT OF THE DISCLOSURE

A method for preparing homogeneous formable collagen compositions having non-collagenous fibers uniformly dispersed therein, particularly compositions having a collagen solids content of at least about 6% by weight which includes the steps of (a) preparing a viscous aqueous dispersion of non-collagenous fibers containing a viscosity control agent, (b) preparing a comminuted preswollen collagen mass, and (c) thoroughly mixing said viscous non-collagenous fiber dispersion and said preswollen collagen mass while maintaining the temperature of the admixture below about 35° C.

---

Figure 1:
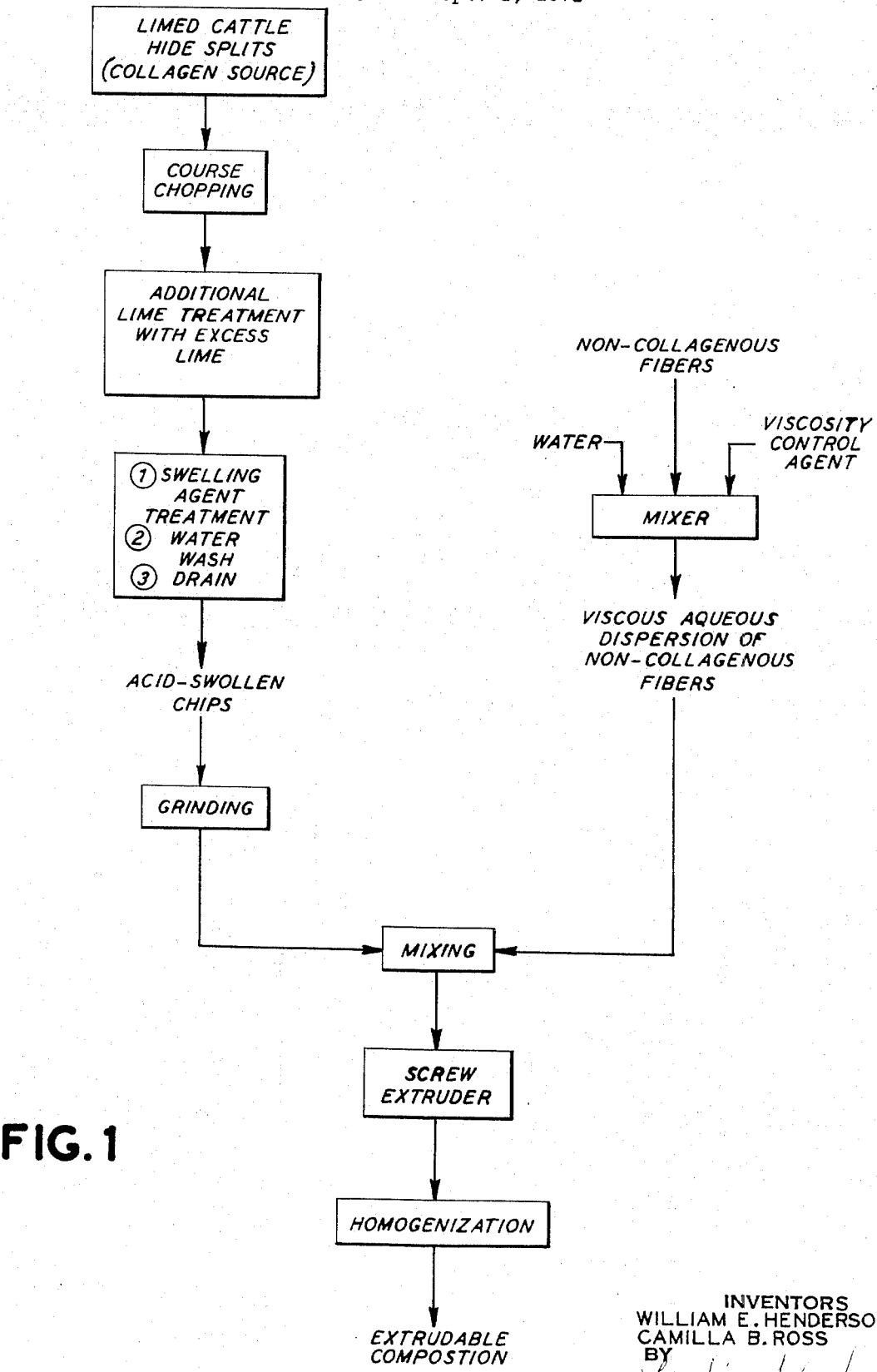

This invention relates to improved collagen compositions and more particularly to a novel method for preparing collagen compositions having non-collagenous fibers uniformly dispersed therein which are particularly suitable for continuous forming into food casings.

A number of products, such as edible food casings made from collagen, are well known in the art and have been prepared and sold in commercial quantities for a number of years. Various additives have been used in the collagen compositions to improve the properties of products produced therefrom. In general, non-collagenous fibers have proven to be especially useful, in some cases, as a reinforcing agent and as a shrink-preventative agent to prevent splitting of sausage casing during cooking.

Methods for incorporating non-collagenous fibers, such as cellulosic fibers, into extrudable collagen compositions are disclosed, for example, in U.S. Pats. 3,123,482 and 3,413,129 to Liberman. The compositions generally prepared in such cases are dilute, low collagen solids compositions (i.e., 2.5–6.0% collagen) wherein cellulose fibers may be, for example, predispersed in water or dilute acids and then admixed with the collagen mass. Dilute collagen compositions are useful for preparation of thin-walled collagen tubing but such compositions must be extruded into liquid coagulation medium using elaborate processing equipment since low concentration collagen compositions are unsuitable for unsupported extrusion into air.

High solids collagen compositions having collagen concentrations greater than about 6% may be extruded into air but the consistency of the high-solids compositions has been found to inhibit incorporation of desired fibrous additives. The addition of cellulose fibers to the more viscous high solids collagen compositions (e.g., about 10% collagen), either dry or predispersed in water or dilute acids, yielded compositions exhibiting non-uniform dispersion of the cellulose fibers with fibrous aggregates formed which interfered with continuous extrusion through the narrow nozzle openings required to form thin-wall tubing such as food casings. The term "extrudable" implies substantial freedom from non-extrudable aggregates. More generally, the term "extrudable" or "formable composition" as used throughout the specification and in the appended claims is intended to refer to the ability to process a mixture in conventional equipment and obtain a commercially acceptable formed structure therefrom.

In Henderson et al. Pat. No. 3,551,535 a process is disclosed for uniformly dispersing cellulosic fibers in extrudable collagen compositions of high collagen concentration. In that process comminuted frozen collagen particles are mixed with non-collagenous fibers to form a uniform mixture and the frozen particles are then permitted to thaw prior to further processing. The process produces uniform, homogeneous compositions but certain aspects thereof have been generally found to be too expensive. Further, one of the advantages of using high collagen solids compositions results from the retention of a substantial portion of collagen fibers in their natural state rather than being dispersed as collagen fibrils. It has been found, however, that the comminution of frozen collagen as in the process described in U.S. Pat. No. 3,551,535 tended to reduce the lengths of collagen fibers.

In accordance with the present invention, we have discovered a method for preparing improved formable collagen compositions which includes the steps of (a) preparing a viscous aqueous dispersion of non-collagenous fiber said aqueous dispersion containing a viscosity control agent; (b) preparing a comminuted preswollen collagen mass; (c) thoroughly mixing said aqueous fiber dispersion with said pre-swollen collagent mass while maintaining the temperature of said admixture below about 35° C. until a uniform admixture is obtained.

The uniform collagen admixture so prepared may then be further processed in any number of ways well known in the art to form homogeneous compositions that are suitable for extrusion or shaping into desired shaped structures such as tubing, sheets, films, filaments and the like.

Collagen compositions prepared in accordance with the practice of the present invention have uniformly dispersed therein non-collagenous fibers and may contain at least about 6% and preferably between about 6.5% and 14% by weight of collagen. In a particularly preferred embodiment, collagen compositions containing between about 7.5% and 12% by weight of collagen and non-collagenous fibers in an amount between about 5% and 30% and preferably between about 10% and 20% by weight of the dry solids content of said composition may be prepared and are advantageously employed for continuous extrusion into thin-wall tubing suitable for use as food casings and the like.

The advantages of the present invention will be more fully appreciated and the invention will be better understood from the following description when considered in conjunction with the accompanying drawing wherein:

FIG. 1 is a flow diagram illustrating one embodiment of the present invention.

As shown in FIG. 1, collagen-containing tissues, as, for example, limed animal hide splits, cleaned and prepared by methods well known in the art, are suitable as the raw material for the process of the present invention. Collagen-containing raw materials obtained from any number of commercially acceptable collagen-containing tissue as, for example, tendon, fresh animal hides and the limed animal hides herein described are also, in general, suitable for use in accordance with the practice of the present invention.

The limed animal hide splits may be diced or coarsely chopped into pieces about ½" to 2" in size to facilitate transfer and agitation and then are subjected to treatment with a collagen swelling agent. Preferably, chopped limed hide splits may be given a further lime treatment prior to treatment with the swelling agent but it is not essential in practicing the present invention.

In the preparation of collagen compositions suitable for use in producing formed structures such as food casings it is generally essential that swollen collagen materials be employed. A typical process for preparing suitable swollen collagen materials involves the treatment of chopped collagen-containing pieces with collagen swelling agents. Any of the known collagen swelling agents may be employed, but it is preferred to use dilute acid solutions such as dilute lactic or acetic acid and especially preferred is dilute hydrochloric acid. Collagen pieces are treated with swelling agent for an extended period of time, i.e., at least about 4 to 9 hours or even longer and generally until the character of the collagen material has completely changed from opaque to translucent. The swollen collagenous material is then washed with water to reduce the amount of the residual acid, it being generally desirable that the pH of a comminuted sample of the swollen collagen ranges between about 2.5–3.5. The swollen collagen is then drained leaving pieces that will hereinafter be referred to as "acid-swollen chips."

Swollen collagen or "acid-swollen chips" suitable for use in accordance with the practice of the present invention may alternatively be prepared by any of a number of methods well known in the art and the process hereinabove described is not intended to limit in any way the present invention.

An essential step in the process of the present invention is the preparation of a viscous dispersion of the non-collagenous fibers that are to be incorporated into the formable collagen compositions.

Aqueous dispersions of non-collagenous fiber having incorporated therein a viscosity control agent are suitable for use in accordance with the present invention. Generally, any one of a number of materials that are water soluble or dispersible, are inert or do not adversely affect the stability of the collagen compositions yet serve to alter and preferably increase the viscosity of the fibrous dispersion may be employed as a viscosity control agent in accordance with the practice of the present invention.

Exemplary of suitable viscosity control agents include carboxymethyl cellulose, gelatine, starch or glycerine. Particularly suitable and preferred is a dispersion of swollen collagen particles.

Non-collagenous fibers suitable for use in accordance with the practice of the present invention may be any of the non-shrinking and essentially inert fibrous additives that are known to be or may be employed in the preparation of collagen compositions. Exemplary of suitable fibrous additives are natural and synthetic fibrous materials such as wood, cotton, rayon and other cellulosic fibers; synthetic non-collulosic fibers such as polyester, polyamide, polyimide and polyolefin fibers, other natural or synthetic materials such as alginates and starches and the like. Particularly suitable are purified fibrous materials that may be employed in edible food products.

A particularly unique and advantageous aspect of the present invention is that non-collagenous fibers and particularly fibers of generally longer length may be incorporated and uniformly dispersed in collagen compositions having high collagen solids, i.e., greater than about 6% by weight of collagen. To the best of our knowledge, extrudable collagen compositions having a high collagen solids content have been prepared with only relatively short length fibrous additives, i.e., less than about .010″ in length incorporated therein, whereas compositions prepared in accordance with the practice of the present invention have been prepared with fibrous materials having average fiber lengths of between about .010″ and .060″, and even longer. Further, it has been found that the incorporation of generally longer fibers in the formable compositions has been accomplished without affecting the edible characteristics of food casings produced therefrom but such casings exhibited substantially improved resistance to shrinkage and/or strength characteristics which is particularly advantageous in the preparation and processing of various types of sausages as well as when such products are cooked by the consumer.

The proportions of the various ingredients used to prepare aqueous fibrous dispersions that are suitable for admixing with swollen collagen particles may vary over a wide range but it is generally preferred that such dispersions be pumpable. It has been found that dispersions containing between about 2% and 10% and preferably between about 4% and 8% by weight of non-collagenous fibers are especially suitable.

The amount of viscosity control agent added to the dispersion depends largely on the amount and type of fibrous material in the dispersion. Generally, the viscosity control agent will be employed in an amount between about 0.1% and 10.0% by weight of the dispersion, and dispersions containing between about 0.3% and 2.0% by weight of swollen collagen have been found particularly suitable.

As shown in FIG. 1, the non-collagenous fiber dispersion as hereinabove described is admixed with the "acid-swollen chips."

Acid-swollen chips used in the preparation of formable collagen compositions in accordance with the present invention are preferably comminuted further prior to mixing with the fibrous dispersion. It will be obvious to those skilled in the art that many variations may be employed with respect to the degree of subdivision of the "acid-swollen chips' prior to mixing with the fibrous dispersion and the type of equipment that may be used for subdividing the chips and mixing the chips and fibrous dispersion.

Preferably, the "acid-swollen chips" are partially subdivided by coarse grinding or crushing in appropriate equipment such as a meat grinder, crusher and the like, wherein a mass containing a predominance of chunks having major dimensions of about ⅛″ to ½″ together with some "fines" is prepared. The subdivided chips will generally contain between about 11% and 18% by weight of collagen solids in water.

Mixing of the viscous fibrous dispersion and subdivided swollen collagen can be readily accomplished by the vigorous mixing action of a suitable dough mixer or other similar mixing equipment and it has been found that the fibrous component is uniformly distributed throughout the collagen mass in a relatively short time, as, for example, between about 2 and 10 minutes. Towards the end of the mixing step, a surprising change in character occurs and the collagen mass becomes much more viscous. This change in character has been found to be quite useful in preventing accidental separation of the components during subsequent processing and results in a mass that may be fed via screw extruders and the like.

It is important during the grinding and mixing of the "acid swollen chips" that the temperature of the collagen mass be kept low. Temperatures as high as 35° C. may be tolerated for a very short time but it is preferred to keep the temperature of the mass below about 20–25° C., and even better, below about 15° C.

In accordance with the practice of the present invention formable collagen compositions containing at least about 6% by weight and preferably between apout 6.5% and 14% by weight of collagen solids having uniformly incorporated therein non-collagenous fibers in an amount between about 5% and 30% and preferably between about 10% and 20% by weight of the total solids of the composition, may be readily prepared and the proportions of subdivided acid-swollen chips and fibrous dispersion that may be admixed in the preparation thereof depends solely on the composition desired for a particular application.

The uniform high collagen solids compositions so prepared are suitable, with only limited further processing such as a final homogenization step, for continuous forming into commercially acceptable formed or extruded structures. The use of a screw extruder or similar device has been found useful but not essential for transferring the uniform collagen mixture to the homogenization equipment.

A particularly advantageous adjunct to the process of the present invention is the discovery that formable collagen compositions prepared thereby do not require the addition of hardening or cross-linking agents.

It is well known in the art that it is generally necessary to subject formed collagen structures to a hardening or cross-linking processing step in order to obtain desired strength characteristics. The extent to which this processing step is required depends to a large degree on the state of natural collagen fibers in the composition. Natural collagen fibers in low collagen solids compositions are usually found to have been converted almost entirely into a "fibril" form and the use of supplementary cross-linking additives such as trivalent metal salts or dialdehydes is necessary to obtain desired strength properties. It has been found, however, that the high collagen solids compositions prepared in accordance with the present invention have retained a sufficient amount of collagen fibers in their natural state to eliminate the need for cross-linking additives, the application of heat being completely suitable in obtaining the supplemental enhancement of physical properties in the finished product.

The following examples are set forth as illustrative embodiments of the present invention and are not intended in any way to indicate the limits of the invention. Parts and percentages, unless otherwise indicated, are by weight.

EXAMPLE 1

1,628 pounds of limed beef hide splits were chopped into approximately ½" to 2" pieces and subjected to an additional lime treatment by charging into a tank together with 128 lbs. of lime and water in a water to hide ratio of approximately 4:1. The lime treatment was continued for 4 days with intermittent agitation after which the limed hide chips were leached with approximately 20 gals./min. of water of 22 hours. The hide chips were then swollen for 9 hours in a hydrochloric acid solution maintained at a pH of 1 using a flow rate of dilute acid of 10 gals./min. At the end of the acid-swell treatment, the swollen chips were washed with water at 30 gals./min. for 60 minutes until a wash water pH of 2.5 was reached. The chips were allowed to equilibrate for 16 hours in the weak acid solution, then drained and chilled to about 1° C.

A cellulose fiber dispersion was prepared using the folling proportion of ingredients:

| | Pounds |
|---|---|
| Extruded collagen dispersion | 20 |
| Wood cellulose fibers | 10.9 |
| Water | 158 |

The wood cellulose fibers used had an average fiber length of about 0.040". Sheets of fibers were separated into convenient pieces, soaked in a portion of the water for about 30 minutes and then mixed for about one minute. The rest of the ingredients were added to the mixer and the mixture was blended for about 40 minutes. The resulting wood cellulose fiber suspension was smooth, highly viscous, free of fiber clumps and had a pH of 3.3.

The resulting cellulose fiber dispersion was calculated to have the following composition:

| | Percent |
|---|---|
| Collagen (solids) | 1 |
| Wood cellulose fibers | 5.6 |
| Water | 93.4 |

A blend of "acid-swollen chips" and cellulose fiber dispersion was prepared using the following proportion of ingredients:

| | Pounds |
|---|---|
| "Acid-swollen chips" | 202.0 |
| Wood cellulose dispersion | 97.7 |
| Water | 27.9 |

"Acid-swollen chips" prepared as described hereinabove were ground in a meat grinder into pieces substantially between about ⅛" to ½" in size prior to blending with the viscous cellulose fiber dispersion. The temperature during grinding of the chips was controlled so as not to exceed about 20° C. Collagen solids in the ground "acid-swollen chips" was determined to be 14.8%.

Blending of "acid-swollen chips" and the cellulose fiber dispersion was readily accomplished in about 5 minutes in a double screw blender and shortly thereafter the viscosity of the mixture was found to have increased substantially. The composition had a collagen solids content of 9.44% and cellulose fibers content of 1.67%.

The collagen-cellulose fiber blend was deaerated and fed through a rotary-shear homogenizer by means of a screw extruder and pump. To prevent degradation of collagen the homogenizer rotor and stator were cooled with a coolant maintained at a temperature about $-5°$ C. The collagen-cellulose fiber blend was fed through the screw extruder and homogenizer at a flow rate of about 260 gms./min.

After homogenization the blend was pumped through two parallel filters with .003" slots to break up any remaining collagen lumps and remove any non-dispersed matter. Very slow filter clogging was observed indicating that the blend was quite smooth and free of non-dispersible particles.

The filtered collagen blend was pumped and metered through an extrusion nozzle having a counter-rotating cup and core with a 0.006" gap to form a continuous tube of collagen. The extruded tube was strong enough to support itself with low-pressure inflation air while being conveyed on horizontal rolls.

The inflated collagen tubing was partially dried and hardened by passing through a predryer at 50° C., then collapsed between nip rolls, neutralized by passing through a dip tank containing 0.06 N ammonium hydroxide for 107 seconds, washed by being conveyed through water tanks for 312 seconds, and then plasticized by being conveyed through a dilute glycerine solution for 216 seconds.

The tubing was then reinflated with low pressure air, dried in air supplied at 107° C., moisturized in an equalizer at 70% RH and then shirred by passing through a shirring apparatus.

The shirred tubing was baked for 20 hours at 72° C. and then conditioned overnight at 64% RH before being stuffed with pork sausage emulsion and linked into sausages. The tubing performed in excellent fashion during the stuffing and linking operations and exhibited very few splits while frying of sausage samples.

In addition to performing well during the sausage stuffing, linking and cooking evaluation, the collagen tubing was found to be very uniform in appearance, no collagen lumps or cellulose fiber clumps being observed throughout the length of tubing prepared.

EXAMPLE 2

"Acid-swollen chips" were prepared using the "hide-splits" and procedure described in Example 1.

A cellulose fiber dispersion was prepared using the following proportion of ingredients:

| | Pounds |
|---|---|
| Extruded collagen dispersion | 265 |
| Wood cellulose fibers | 144 |
| Water | 2092 |

The wood cellulose fibers described in Example 1 were used in the preparation of the cellulose fiber dispersion of this example. The solids content of the dispersion was calculated to be the same as the cellulose dispersion of Example 1. Cellulose fiber sheets were torn into more convenient sized pieces, soaked in water for 1 hour 20 minutes and then mixed for 4 minutes. The collagen dispersion was then added and mixing was continued for 45 minutes, the viscosity of the fibrous dispersion being thereby noticeably increased. The fibrous dispersion was examined and found to be free of fiber clumps. The fibrous dispersion prepared in this example was prepared from substantially larger quantities of ingredients than used in Example 1 and a uniform viscous dispersion was readily prepared.

"Acid-swollen chips" and fibrous dispersion of this example were mixed in the following proportions:

|  | Pounds |
|---|---|
| Ground "acid-swollen chips" | 219.0 |
| Wood cellulose dispersion | 105.8 |
| Water | 29.9 |

The "acid-swollen chips" used in this example were partially frozen after draining off the wash water and were then ground with a meat grinder into particles between about ⅛" to ½" in size with very little heat build-up being experienced during the grinding operation. The ground swollen collagen had a collagen solids content of 14.8%.

The collagen-fiber mixture was prepared as in Example 1 and had a composition containing 9.44% collagen solids and 1.67% wood cellulose fibers.

The collagen-fiber mixture was homogenized, filtered and extruded using the procedures of Example 1 and tubing was prepared that exhibited uniform distribution of fiber throughout the collagen mass with no collagen lumps or cellulose fiber clumps observed.

EXAMPLE 3

Ground "acid-swollen chips" prepared by using the procedure of Example 1 were used in this example.

A cellulose fiber dispersion was prepared as follows:

0.32 pound of gelatine were added to 3.75 lbs. of water and 10 cc. of concentrated hydrochloric acid and mixed until the gelatine became swollen.

7.58 pounds of water at 50° C. were added to the gelatine mixture and the gelatine was dissolved.

0.52 pound of wood cellulose fibers having an average fiber length of .008"–.010" were added to the gelatine solution with mixing.

The resulting viscous wood cellulose fiber dispersion was cooled to 35° C. and then poured over an 18 lb. batch of ground "acid-swollen chips." The mixture was blended rapidly by hand and the fibrous dispersion was readily incorporated into the swollen collagen mass. The mixture set up into a gel on standing.

The collagen-fibrous mixture was then homogenized filtered and extruded into tubing using the procedure of Example 1. The wood cellulose fibers appeared to be well dispersed throughout the tubing with no collagen lumps or cellulose fiber clumps observed.

EXAMPLE 4

A 460 lb. batch of "acid-swollen chips" prepared as in Example 1 was treated with an ammonia solution for 6 hours which deswelled them. The collagen chips were then leached with water for 16 hours and drained. The deswelled batch of collagen was added to a tank containing a solution of 78 lbs. of 80% lactic acid in 142 gallons of water having a pH of 1.90. The collagen chips were soaked in the acid solution with agitation for 6 hours during which time the collagen chips were observed to swell rapidly and the acid solution pH rose to 2.12. The "acid-swollen chips" were drained without washing, partially frozen and ground with a meat grinder.

A cellulose fiber dispersion was prepared having the following proportion of ingredients:

|  | Pound |
|---|---|
| Extruded collagen dispersion | 34.0 |
| Wood cellulose fibers | 20.3 |
| Water | 285.7 |

The extruded collagen dispersion used in this example was prepared from lactic acid swollen collagen. The wood fibers of Example 1 were used in this example. The cellulose fiber dispersion was mixed as described in Example 1 and was calculated to have a collagen solids content of 1% and wood cellulose fiber content of 5.6%.

The cellulose fiber dispersion prepared above was mixed with the ground "acid-swollen chips" of this example using the following proportion of ingredients:

|  | Pounds |
|---|---|
| "Acid-swollen chips" | 222.0 |
| Cellulose dispersion | 103.7 |
| Water | 15.9 |

The ingredients were readily mixed in a twin screw mixer for about 5 minutes while keeping the temperature below about 15° C., after which the mixture was found to become substantially more viscous.

The collagen-cellulose fiber mixture was homogenized, filtered and extruded into a tubular casing according to the procedure of Example 1. The extruded tubing was treated and shirred as described in Example 1. Shirred tubular casing of the example performed well during sausage stuffing, linking and frying evaluations.

EXAMPLE 5

A cellulose fiber dispersion consisting of 6% starch and 5.6% wood cellulose fibers having an average length of about .010" was prepared using the procedure described below. The starch was dissolved in water and then boiled until thickened. The thickened solution was cooled and wood cellulose fibers were added thereto with mixing. After mixing for a short time, the resulting viscous dispersion was found to be well dispersed and free of fiber clumps.

Ground "acid-swollen chips" prepared as in Example 1 were mixed with the cellulose fiber dispersion of this example to make a collagen-cellulose fiber blend having a total solids content of 12.4%. The collagen-cellulose fiber blend was homogenized by using a cylinder and piston to push the composition first through a perforated plate having .040" holes and then through a slotted plate having .004" wide slots.

Films pressed from the collagen-cellulose fiber composition and dried overnight were found to have the cellulose fibers well dispersed throughout the collagen mass.

The collagen-cellulose fiber composition was readily extrudable into strands that exhibited no collagen lumps or cellulose fiber clumps.

While the present invention has been set forth with particularity and described in some detail, it should be understood that changes, modifications and alterations can be made therein without departing from the scope of the invention.

What is claimed is:

1. A process for preparing a formable collagen composition including the steps of:
   (a) preparing a viscous aqueous dispersion of non-collagenous fibers said aqueous dispersion containing a viscosity control agent;
   (b) preparing a comminuted pre-swollen collagen mass; and
   (c) thoroughly mixing said aqueous fiber dispersion with said pre-swollen collagen mass until a uniform admixture is obtained while maintaining the temperature of said admixture below about 35° C.

2. The process of claim 1 in which said uniform admixture contains at least about 6% by weight of collagen.

3. The process of claim 1 in which said comminuted pre-swollen collagen mass comprises particles of substantially about ⅛" to ½" in major dimension.

4. The process of claim 1 in which said non-collagenous fibers are cellulose fibers.

5. The process of claim 1 in which said aqueous dispersion contains non-collagenous fibers in an amount between about 2% and 10% by weight.

6. The process of claim 1 which includes the additional step of homogenizing the uniform admixture.

7. The process of claim 1 in which said aqueous dispersion of non-collagenous fibers contains between about 0.1% and 10.0% by weight of a viscosity control agent.

8. The process of claim 7 wherein said viscosity control agent comprises between about 0.3% and 2.0% by weight of collagen.

9. A method of producing edible shaped collagen structures including the steps of:
   (a) preparing a viscous aqueous dispersion of non-collagenous fibers said aqueous dispersion containing a viscosity control agent;
   (b) preparing a comminuted pre-swollen collagen mass;
   (c) thoroughly mixing said aqueous fiber dispersion with said pre-swollen collagen mass until a uniform admixture is obtained while maintaining the temperature of said admixture below about 35° C.;
   (d) feeding said uniform collagen-non-collagenous fiber admixture to and through the extrusion zone of an extruder to produce a shaped collagen structure.

10. The method of claim 9 in which said aqueous dispersion contains between about 2% and 10% by weight of non-collagenous fibers.

11. The method of claim 9 in which said aqueous dispersion of non-collagenous fibers contains between about 0.1% and 10.0% by weight of a viscosity control agent.

12. A tubular collagen food casing prepared in accordance with the method of claim 9.

13. The method of claim 9 in which said uniform collagen-non-collagenous fiber admixture comprises between about 6% and 14% by weight of collagenous solids and between about 5% and 30% by weight of the total solids in said uniform mixture is non-collagenous fibers being substantially at least about .010" in length.

14. The method of claim 13 which includes the additional step of homogenizing the uniform collagen-non-collagenous fiber admixture before extruding said mixture.

15. A tubular collagen food casing prepared in accordance with the method of claim 14.

References Cited

UNITED STATES PATENTS

| | | | |
|---|---|---|---|
| 3,551,535 | 12/1970 | Henderson | 99—176 X |
| 3,684,540 | 8/1972 | Henderson | 99—176 X |
| 3,123,482 | 3/1964 | Lieberman | 99—175 X |
| 3,123,483 | 3/1964 | McKnight | 99—176 |
| 3,123,653 | 3/1964 | Lieberman | 99—175 UX |
| 3,408,918 | 11/1968 | Talty | 99—176 |
| 3,413,129 | 11/1968 | Lieberman | 99—176 |
| 3,535,125 | 10/1970 | Fagan | 99—176 |
| 3,494,772 | 2/1970 | Bradshaw | 99—176 |
| 3,494,773 | 2/1970 | Courts | 99—16 |
| 3,665,988 | 5/1972 | Aceto | 99—176 X |

MORRIS O. WOLK, Primary Examiner

S. MARANTZ, Assistant Examiner

U.S. Cl. X.R.

264—209, 210; 426—342